G. R. WILLIAMS.
Horse-Rake.

No. 222,762. Patented Dec. 16, 1879.

Witnesses:

Inventor:
Geo. R. Williams

UNITED STATES PATENT OFFICE

GEORGE R. WILLIAMS, OF ITHACA, NEW YORK.

IMPROVEMENT IN HORSE-RAKES.

Specification forming part of Letters Patent No. 222,762, dated December 16, 1879; application filed October 14, 1879.

*To all whom it may concern:*

Be it known that I, GEORGE R. WILLIAMS, of Ithaca, in the county of Tompkins and State of New York, have invented a certain Improvement in Horse Hay-Rakes, of which the following is a specification.

This rake has a continuously-revolving axle (which may be either entire or divided) driven by the carriage-wheels. Upon this, at or near the center of the rake, is a clutch consisting of a gear, friction, or ratchet device, through means of which the rake-teeth may be raised to release their load. A wooden axle-head forms a bearing for this axle, and near its center are hung, on pivots, two light bars or other suitable devices, which, reaching backward, project into the curve of the teeth, where the hay collects. The forward ends of these bars are so connected to the clutch that when the load of hay gathered in the teeth begins to push upward on their rear ends their motion throws the clutch into gear, and the rake is dumped. The clutch has a guide, by means of which, after being tripped into gear, it cannot get out until the teeth are fully raised to release the load; then is automatically forced out, and cannot again be thrown into gear till the teeth have returned to place.

A pressure device is so arranged as to be thrown into place automatically on the dropping of the teeth to their work. This pressure device is also released automatically at the proper time by the device which throws the clutch in gear to lift the teeth.

It being often desirable to carry the gathered hay to a certain place before releasing it, there is a foot-lever attached to the pressure and dumping device in such a manner that the action of the rake may be thoroughly governed by the driver when desired.

For further description of this invention see the drawings hereto attached, in all which similar parts are designated by similar letters.

Figure 1:
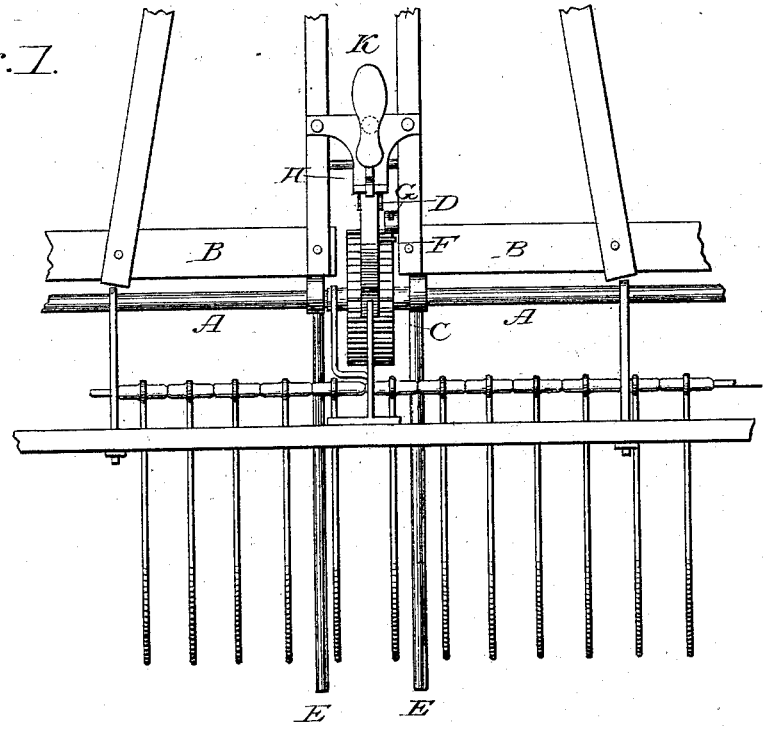
Figure 2:
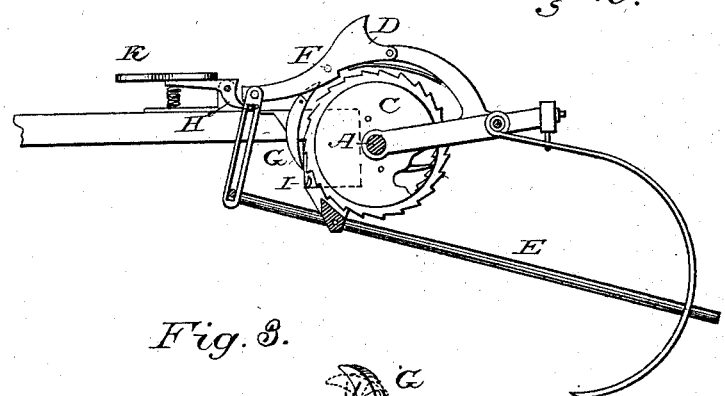
Figure 3:
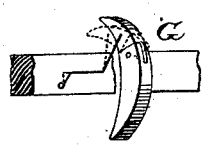

Figure 1 shows a top view of this rake; Fig. 2, a side view, showing the clutch and the stop for producing pressure, and the manner of working the clutch by the motion of the cleaner-bars. This also shows the device for keeping the clutch in or out of gear and the lever by which the driver may govern the action of the rake.

A is the revolving axle; B, wooden head, upon which are fastened axle-bearings, &c.; C, dumping-gear; D, lever supplied with tooth, which engages gear when rake-teeth are to be lifted; E, cleaners, so arranged as to be lifted by the gathering load of hay, and by their lifting to draw lever D into gear. The side tooth, F, on this lever is drawn beneath cam-shaped piece G when rake-teeth are to be lifted, and the same motion releases its forward end from the stop H. When the teeth are fully raised by the motion of the gear this tooth F strikes the wedge-cam I and is thrown out of gear, and the teeth at once come back into raking position, the cam G meantime preventing the lever D from being thrown into gear. The forward end of lever D is again brought by this motion in position to be held by the stop H while teeth are gathering a new load.

As the teeth fall after releasing their load, and the lever D rises to take its place as a pressure device upon stop H, the pin F meantime following the outer surface of cam G, interference between the outer end of lever D and the stop H is to be avoided. This is done by the hinging of the upper part of cam G so that it may yield, allowing pin F to approach the gear, permitting end of lever D easily to pass stop H. The spring upon D then at once throws its end into place to produce pressure by meeting the face of stop H. At the base of this stop a foot-lever, K, operates to hold the automatic device from working when it is desired to gather an unusual load or to carry the gathered load to some special place.

When it is desired to hold the teeth up for transportation of the rake the lever K is pressed down, while the teeth are raised, so catching upon a tooth at the upper rear end of lever D as to hold the teeth up, the wedge-cam I having thrown the lever out of gear, leaving it free to be held stationary by this device.

The driver can at any time lift the rake-teeth and release the load by pressing upon the lever D, throwing it into gear.

It will easily be seen that a friction-clutch or a gear-clutch differently placed could be made to effect the same automatic action of a horse-rake, and the special plan herein given is shown as one practical example of this invention.

What I claim as my invention, and desire to secure by Letters Patent, is—

1. The combination, in a horse-rake which is discharged of its load through the power of the horse, of the rake-head and a clutching device automatically operated to cause the teeth to be lifted at the proper time without the aid of the driver.

2. In combination with the rake-head, a lever projecting into the hollow of the teeth, and which is moved by the gathering load, and a clutch operated by said lever to raise the teeth and dump the load.

3. The combination, in a horse-dumping hay-rake, of an automatically-operated clutch to raise the teeth and a lever through means of which the driver can control the rake when desired.

GEORGE R. WILLIAMS.

Witnesses:
WM. G. KING,
R. B. WILLIAMS.